United States Patent [19]
Hobbie et al.

[11] Patent Number: 5,190,355
[45] Date of Patent: Mar. 2, 1993

[54] SEAL FOR DRIVE-WHEEL-HUB ASSEMBLY

[75] Inventors: James R. Hobbie, Galesburg, Mich.; Ronald L. Hughes, Lexington, N.C.

[73] Assignee: Eaton Corporation, Cleveland, Ohio

[21] Appl. No.: 726,088

[22] Filed: Jul. 5, 1991

[51] Int. Cl.⁵ .............................................. B60B 27/00
[52] U.S. Cl. ................... 301/105.1; 301/108.1; 384/477
[58] Field of Search ........... 301/105 R, 108 R, 108 A, 301/108 S, 108 SC, 108 TW, 124 R, 124 H; 384/130, 477, 489, 481

[56] References Cited

U.S. PATENT DOCUMENTS

| | | | |
|---|---|---|---|
| 2,453,635 | 11/1948 | Martin, Jr. | 301/105 R |
| 3,960,415 | 6/1976 | Westervelt | 384/481 |
| 4,811,992 | 3/1989 | Steiner | 301/105 R |
| 5,011,233 | 4/1991 | Nomura et al. | 301/108 R |
| 5,042,882 | 8/1991 | Kuhn et al. | 301/105 R X |

Primary Examiner—Russell D. Stormer
Attorney, Agent, or Firm—C. H. Grace

[57] ABSTRACT

An outer seal for a drive-axle-wheel hub keeps axle-gear lubricant separated from wheel-bearing grease by preventing leakage to and from the wheel-bearing cavity at the outer end of the spindle. A sleeve-like outer-seal journal (50) is pressed into a groove (60) in the outer face of an outer lock nut (38). A seal-carrier ring (62) fits over the wheel hub drive studs (22) between a hub (16) and an axle-shaft cap (42). The ring (62) carries a lip-type resilient outer seal (52) that slidably presses against the outer seal journal (50). Wheel bearing life is extended.

9 Claims, 3 Drawing Sheets

SEAL FOR DRIVE-WHEEL-HUB ASSEMBLY

FIELD OF THE INVENTION

The invention relates generally to vehicular drive-axle assemblies, and more particularly to the outer end of the axle shaft, the spindle, the hub, and lubrication of wheel bearings between the hub and the spindle. It may be particularly useful for the grease-packed wheel ends of light, medium and heavy-duty trucks and buses.

SUMMARY OF THE INVENTION

In North America, a basic and conventional type of full-floating wheel hub is used on most drive axles that are not of a hub-reduction type. Such hub assemblies are sometimes packed with synthetic wheel grease.

The invention provides an outer seal for a drive-axle wheel hub, whose purpose is to keep axle-gear lubricant separated from the grease with which the wheel bearings are packed. By means of the outer seal, the lives of the wheel bearings and the spindle assembly are extended by retaining the extended-life synthetic wheel grease in place and keeping it uncontaminated by axle lubricant. In the trucking industry wheel seal leakage has been an important maintenance problem, and it is alleviated by the invention.

The invention can be implemented by providing an outer seal journal that is attached to the outer spindle lock nut, and a mating lip-type resilient seal that is supported by a seal-carrier ring. The seal-carrier ring fits over the hub studs. The apparatus is retrofittable and can be adapted to most standard non-hub-reduction wheel ends, by using a modified outer spindle lock nut and the seal-carrier ring.

In this invention, the wheel-bearing grease of the drive hub is sealed away from the fluid axle-gear lubricant required in the drive sump of the drive axle, so the fluid axle-gear lubricant does not contaminate the wheel-bearing grease. The improvement enables less-frequent maintenance work on the wheel ends.

Accordingly, one object of the invention is to provide an add-on seal assembly to separate the axle-gear lubricating system from the wheel-bearing grease cavity.

Another object is to provide seal components that include an outer seal journal fitted to an outer spindle lock nut, and an outer resilient seal member supported by a seal-carrier ring that is affixed by the hub studs.

Other objects of the invention are apparent from the accompanying description, claims and figures that describe it.

DESCRIPTION OF THE PREFERRED EMBODIMENT OF THE INVENTION

Figure 1:
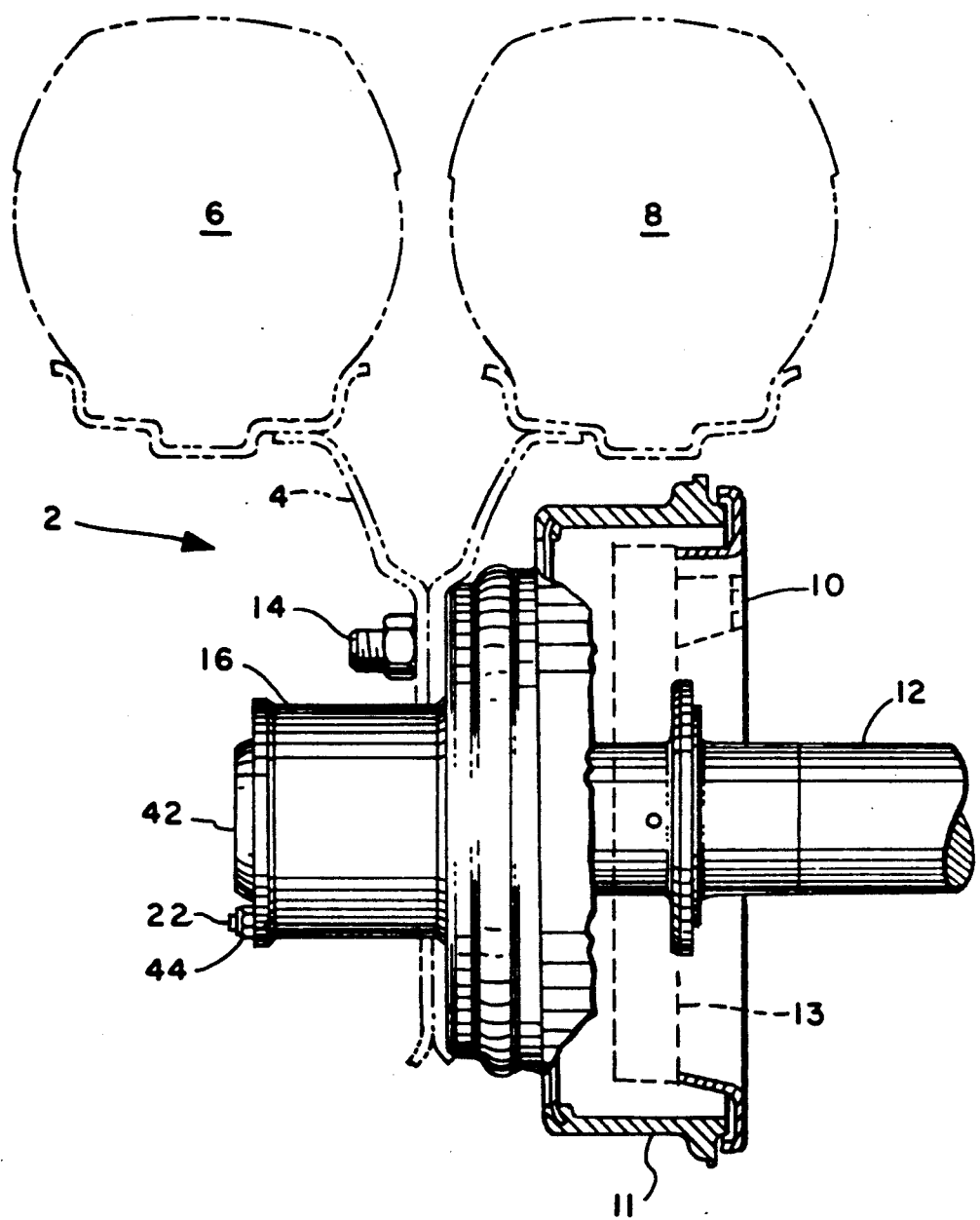
FIG. 1 illustrates a vehicular wheel-end assembly of a preferred embodiment, and includes outlines of a brake, a double wheel and tires.

In FIG. 1 an outer end portion of an axle assembly is shown along with a wheel and brake assembly, all of which are referred to generally by reference numeral 2. The figure includes a double steel wheel 4 and tires 6, 8 for supporting the vehicle and conveying motive power to the roadway as is conventional. A conventional brake assembly 10 has brake shoes 13 that are mounted on an axle housing 12 and that contact a brake drum 11 when the brake shoes 13 are expanded.

The wheels 4 are mounted by means of wheel studs and nuts 14 to the wheel hub 16. The hub 16 conveys torque to the wheels 4 that it supports, and it retains wheel grease with which the interior of the hub is packed.

Figure 2:
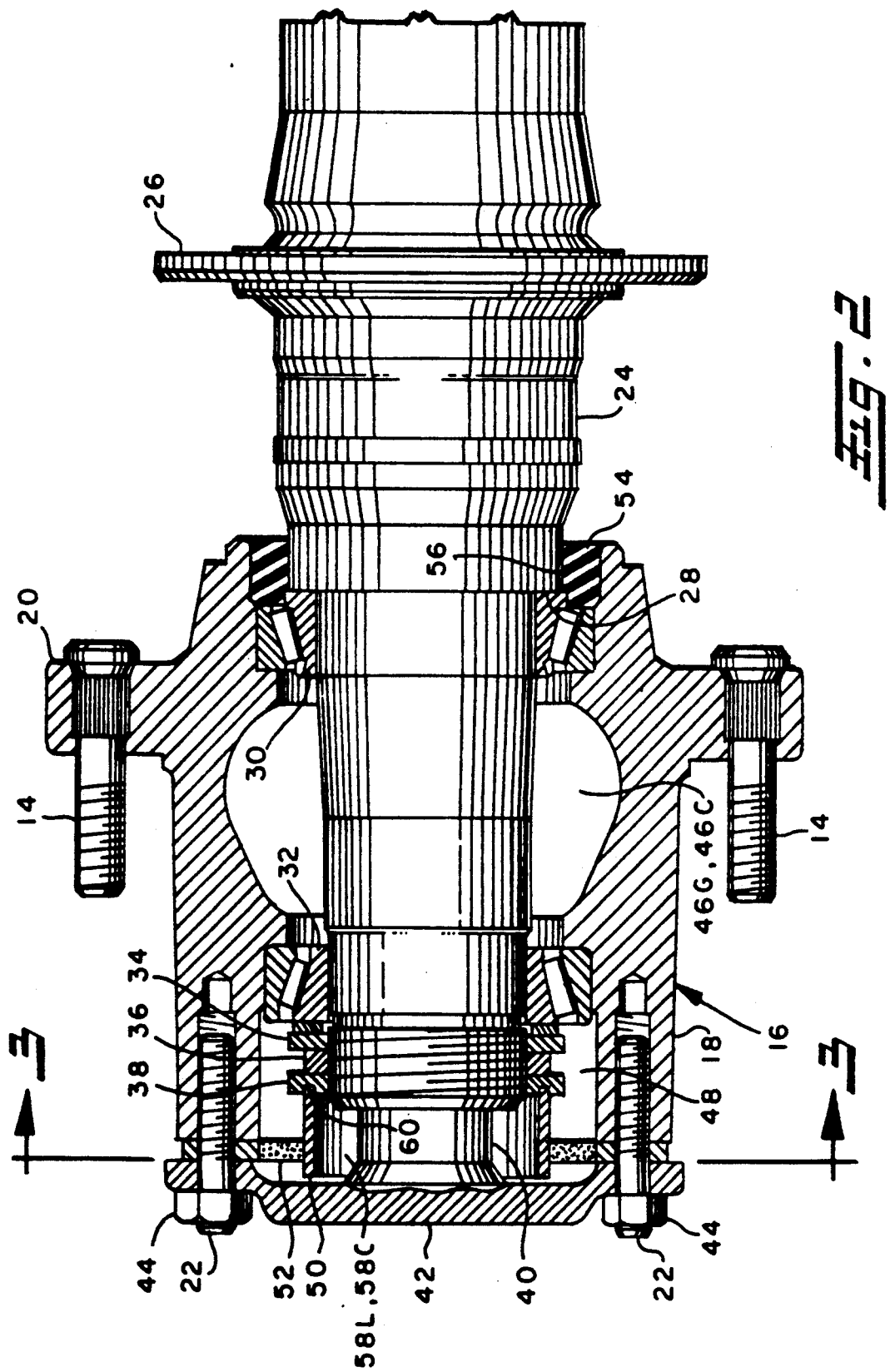
FIG. 2 is a detailed cross-sectional illustration of the spindle, wheel bearings, and seals, showing especially an outer seal which is a barrier for separating wheel grease and axle lubricants.
Figure 3:
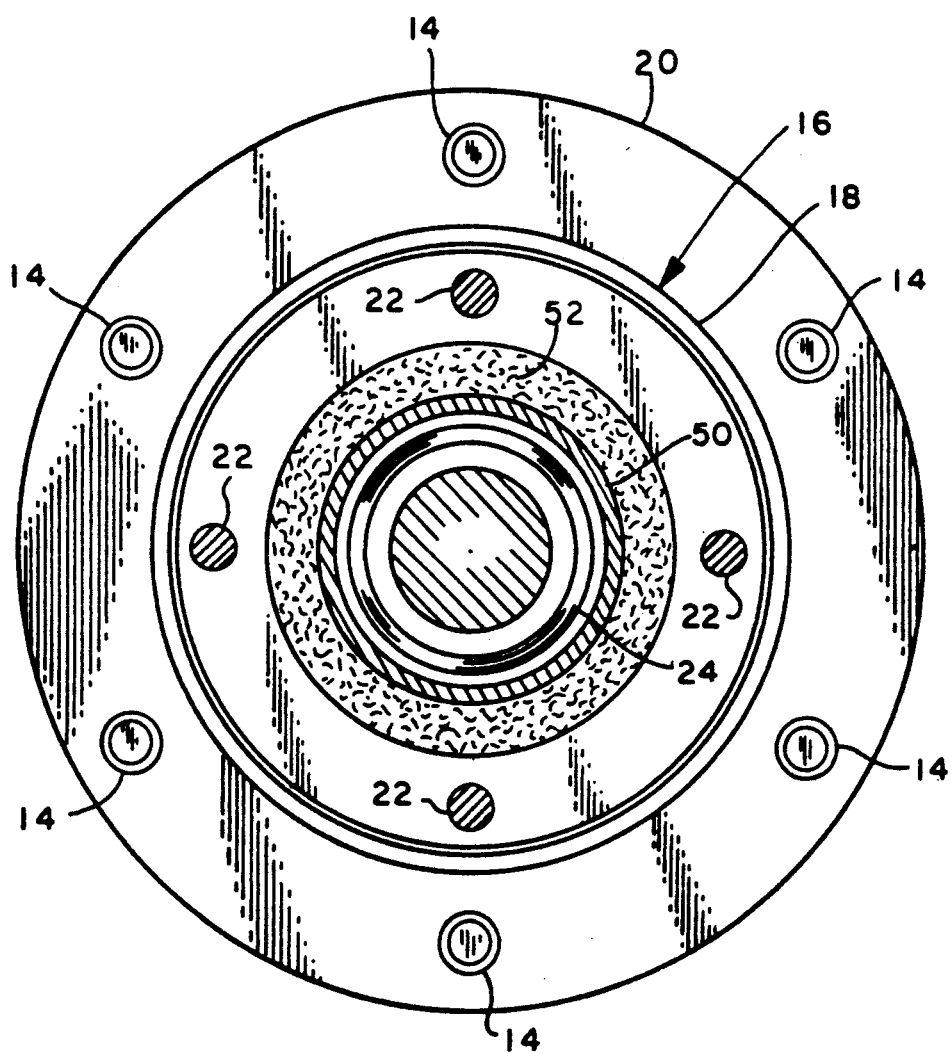
FIG. 3 shows the wheel hub as viewed when facing the outer end of the drive axle along a section line 3—3 of FIG. 2.

The wheel hub 16 is shown more clearly in FIGS. 2 and 3. It comprises a generally cylindrically shaped member 18 that has a robust flange 20 for supporting both the wheel studs 14 and the brake drum 11. The wheel hub 16 also has cap studs 22.

The axle housing 12 has a conventional spindle 24, which does not rotate. The axle housing 12 is supported on the chassis of the vehicle by springs which are not shown. The spindle 24 supports the hub 16 for rotation and encloses a drive-axle shaft 40. A flange 26 supports the brake shoe assembly 13.

The spindle 24 has a shoulder 28 against which an inner bearing 30 presses axially. It also has a support surface 31 at its outer end for an outer bearing 32. At the extreme outer end of the spindle 24 is an exteriorly threaded end portion for receiving a bearing-adjusting nut 34, a lock ring 36, and an outer lock nut 38. An outer surface 33 of the spindle 24 is part of a reservoir cavity 46C for packing of grease 46G for the wheel bearings 30, 32.

The axle shaft 40 is a long rod having a disk-like cap 42 on its outer end. It transmits drive torque from the differential of the vehicle to the hub 16. The cap 42 has holes that fit over the studs 22, and is affixed to the hub 16 by nuts 44 on the studs 22. The axle shaft 40, its cap 42, the studs 22, the hub 16 and the studs 14 deliver torque from the differential to the wheels 4.

The synthetic wheel bearing grease 46G is packed into the cavity 46C that is bounded by the wheel bearings 30, 32, the interior of the hub cylinder 18, and the exterior surface 33 of the spindle 24. The grease 46G lubricates the inner and outer wheel bearings 30, 32 of the hub 16 and spindle 24. The grease 46G is properly present also in a smaller cavity 48 that is bounded by the outer wheel bearing 32, an interior surface of the hub cylinder 18, and seal components 50, 52 described below.

The wheel bearing grease 46G is prevented from leaking at the inner end of the cavity 46C by a standard inner seal 54 that is affixed to the hub cylinder 18 and that slidably engages a polished exterior surface 56 of the spindle 24. The wheel bearing grease 46G is retained at the outer end of the cavities 46C and 48 by the journal 50 and resilient seal 52.

Some axle lubricant 58L sometimes leaks through a seal (not shown) at the differential end of the axle shaft 40 and migrates outward in the cylindrical cavity between the axle shaft 40 and the inside surface of the axle housing 12 and spindle 24. It reaches a cavity 58C in the hub (FIG. 2).

Because the axle lubricant 58L is a type that which is not best for the wheel bearings 30, 32, if it were to get into the wheel-bearing grease cavities 46C, 48 it would contaminate and reduce the lubricating quality of the wheel bearing grease 46G. Such contamination is prevented by the journal 50 and seal 52.

In this embodiment, the outer seal journal 50 is a generally cylindrical sleeve whose inner end is mounted by pressing into a groove 60 in the outer face of the outer lock nut 38. The outer seal journal 50 does not rotate, and is short enough that its outer end does not interfere with the axle-shaft cap 42. It has a polished exterior cylindrical surface that is slidably engaged by the rotatable resilient outer seal member 52.

The resilient outer seal 52 is a washer-shaped annular ring fabricated from conventional resilient rotating-seal material. Its inside-radius surface slidably engages the polished outer-radius surface of the outer seal journal 50. The outer-radius surface of the outer resilient seal member 52 is affixed to a seal-carrier ring 62.

The seal-carrier ring 62, shown in FIG. 2, is an annular washer-shaped ring having holes to accommodate the studs 22 by which the axle-shaft cap 42 is mounted to the hub cylinder 18. The seal member 52 is bonded to the inside surface of the seal-carrier ring 62. The seal-carrier ring 62 is interposed between the outer surface of the hub cylinder 18 and the inner surface of the axle-shaft cap 42, and therefore is held in place by the nuts 44. The seal member 52 and the ring rotate together with the hub 16 and the wheels.

The apparatus described above forms an outer seal that prevents leakage of the synthetic grease 46G in an outward direction from the cavities 46C and 48, and prevents leakage of axle lubricant 58L from the cavity 58C in an inward direction toward the cavity 48. Thus, the synthetic grease 46G is effectively prevented from mixing with the axle lubricant 58L.

The invention has been illustrated by one particular preferred embodiment, but clearly many other embodiments of the invention are possible. The scope of the invention is determined by the claims below.

What is claimed is:

1. A seal for a drive-wheel-hub assembly that has an axle shaft (40) extending outwardly from a differential; a generally cylindrical non-rotatable axle housing (12) and spindle (24) enclosing said axle shaft, that define a first cavity between said axle shaft and the interior surface of said spindle; an end cap (42) on the outer end of said axle shaft; a rotatable inwardly extending hub (16) affixed to said end cap, forming a second cavity (46C, 48) between the inside-diameter surface of said hub and the outside-diameter surface (33) of said spindle; and wheel bearings (30, 32) in said second cavity, engaging said outside-diameter surface of said spindle and said inside-diameter surface of said hub for rotatably supporting said hub relative to said spindle; comprising:
   outer seal means (50, 52, 62) fixedly supported between said first (58C) and second (46C, 48) cavities for sealing off said first cavity from said second cavity for lubricants, wherein said outer seal means comprises:
   first outer seal means (50) fixedly supported with respect to said spindle (24) and located outward of said bearing (32) for lubricant sealing; and,
   second outer seal means (52, 62) fixedly supported with respect to said hub (16) and slidably engaging said first outer seal means (50) for forming a rotational seal with said first outer seal means.

2. A seal as in claim 1 and wherein at least one of said first (50) and second (52) outer seal means is a resilient seal member.

3. A seal as in claim 1 and wherein said first outer seal means comprises a journal (50) having a cylindrical outside-diameter surface for engaging said second outer seal means (52).

4. A seal as in claim 1 and further comprising a nut (38) threaded on the outer end of said spindle, and wherein said first outer seal means (50) comprises a seal means immovably fixed with respect to said nut for support.

5. A seal as in claim 4 and wherein said first outer seal means (50) is affixed to said nut (38) in an annular groove (60) in the outer face of said nut.

6. A seal as in claim 1 and wherein said second outer seal means comprises a resilient annular seal (52) having a cylindrical inside-diameter surface for rotationally engaging said first outer seal means (50).

7. A seal as in claim 1 and further comprising at least two threaded fasteners (22) for affixing said hub (16) to said end cap (42), and wherein said second outer seal means (52) comprises a seal means held with respect to said threaded fasteners for support.

8. A seal as in claim 7 and wherein said second outer seal means also comprises a rigid seal carrier ring (62), to an inside surface of which said resilient annular ring (52) is affixed.

9. A seal for drive-wheel-hub assembly that has an axle shaft (40) extending outwardly from a differential; a generally cylindrical non-rotatable axle housing (12) and spindle (24) enclosing said axle shaft that defines a first cavity (58C) between said axle shaft and the interior surface of said spindle; an end cap (42) on the outer end of said axle shaft; a rotatable inwardly extending hub (16) affixed to said end cap, forming a second cavity (46C, 48) between the inside-diameter surface of said hub and the outside-diameter surface (33) of said spindle; and wheel bearings (30, 32) in said second cavity, engaging the outside-diameter surface of said spindle and said inside-diameter surface of said hub for rotatably supporting said hub relative to said spindle; comprising:
   a nut (38) threaded on the outer end of said spindle, and having an annular groove (60) in the outer face of said nut;
   a journal (50) affixed in said annular groove of said nut, and having a cylindrical outside-diameter surface;
   a resilient annular seal (52) having a cylindrical inside-diameter surface for rotationally engaging said cylindrical outside-diameter surface of said journal (50);
   a rigid seal-carrier ring (62) having an inside surface to which said resilient annular ring (52) is affixed for supporting said resilient annular ring;
   at least two threaded fasteners (22) for affixing said end cap (42) to said hub (16), wherein said threaded fasteners support said rigid seal-carrier ring (62) with respect to said hub (16).

* * * * *